United States Patent [19]

Wu et al.

[11] Patent Number: 5,081,209

[45] Date of Patent: Jan. 14, 1992

[54] COMPOSITIONS AND METHODS FOR INHIBITING CORROSION

[75] Inventors: Yulin Wu; Roy A. Gray, both of Bartlesville, Okla.

[73] Assignee: Phillips Petroleum Company, Bartlesville, Okla.

[21] Appl. No.: 425,297

[22] Filed: Oct. 23, 1989

[51] Int. Cl.$^5$ .......................................... C08F 228/02
[52] U.S. Cl. .................................. 526/224; 526/286; 526/318.44
[58] Field of Search ................ 526/286, 224, 318.44

[56] References Cited

U.S. PATENT DOCUMENTS

| | | | |
|---|---|---|---|
| 3,498,942 | 3/1970 | Dannals | 524/460 |
| 3,498,943 | 3/1970 | Dannals | 260/29.6 |
| 3,665,035 | 5/1972 | Rice et al. | 260/537 |
| 3,668,230 | 6/1972 | Dannals | 260/465.4 |
| 3,764,530 | 10/1973 | Burland et al. | 252/8.5 |
| 3,772,382 | 11/1973 | Dannals | 260/481 |
| 3,787,488 | 1/1974 | Greenfield | 562/594 |
| 3,904,685 | 9/1975 | Shahidi et al. | 260/537 |
| 3,980,602 | 9/1976 | Jakubauskas | 524/561 |
| 4,371,657 | 2/1983 | Chang | 524/512 |
| 4,526,813 | 7/1985 | Wu | 427/235 |
| 4,548,982 | 10/1985 | Clark, Jr. et al. | 524/556 |
| 4,608,191 | 8/1986 | Wu | 252/391 |
| 4,650,594 | 3/1987 | Wu | 252/8.555 |

OTHER PUBLICATIONS

An Organic Newsletter Published by Pennwalt, 1 Organotopics, No. 3.

Primary Examiner—Joseph L. Schofer
Assistant Examiner—Jeffrey T. Smith
Attorney, Agent, or Firm—Laney, Dougherty, Hessin & Beavers

[57] ABSTRACT

A composition which forms a corrosion-inhibiting film when applied to a metal surface. The composition comprises a low molecular weight polyfunctional polymer formed by polymerizing a vinyl monomer in the presence of a mercaptan chain transfer agent. In one embodiment, the composition comprises a low molecular weight polyfunctional polymer represented by the general formula:

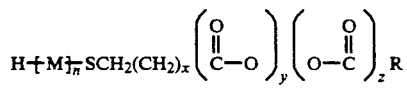

wherein M is a repeating vinyl monomer unit, n is from about 2 to about 40, x is from 0 to about 10, y is from 0 to 1, z is from 0 to 1 if y is 0 and 0 if y is 1 and R is hydrogen, an alkyl group, a hydroxy alkyl group or an alkoxy group. A method of treating a metal surface by contacting the metal surface with a composition that forms a corrosion-inhibiting film thereon is also provided. The composition and methods are useful for inhibiting corrosion of downhole metal surfaces present in oil and gas wells.

13 Claims, No Drawings

COMPOSITIONS AND METHODS FOR INHIBITING CORROSION

BACKGROUND OF THE INVENTION

I. Field of the Invention

The present invention relates to compositions and methods for treating metal surfaces to increase their resistance to corrosion. In a specific embodiment, the invention relates to compositions and methods for treating downhole metal surfaces present in oil and gas wells to inhibit corrosion thereof.

II. Background of the Invention

Corrosion of metal surfaces due to reactions between the metal and its environment is a problem that is well known. If not properly controlled, corrosion can lead to great financial loss and wastage of materials.

Metal surfaces present in oil and gas wells are particularly susceptible to corrosion. Oil and gas wells typically contain water that has a high electrolyte concentration as well as many highly corrosive chemicals such as hydrogen sulfide, carbon dioxide and various organic acids. Corrosion of metal surfaces is particularly a problem in deep-sea oil and gas wells where temperatures of 90° C. or higher and pressures of 1000 psig or higher exist. The extreme conditions of pressure and temperature act to increase the rate of corrosion and make the problem more difficult to deal with.

Excessive corrosion of pipes, pumps and other equipment that are present in or used in association with oil and gas wells is a serious problem that, if not sufficiently controlled, can lead to premature failure of the equipment resulting in high maintenance and parts replacement costs. As a result, it is necessary to treat the metal surfaces of pipes and other equipment present in or used in association with oil and gas wells to prevent or at least inhibit corrosion thereof.

A variety of corrosion-inhibiting agents and techniques for treating metal surfaces have been developed heretofore. Many of the corrosion-inhibiting agents developed heretofore are not stable under the conditions typically encountered in oil and gas wells and inhibit corrosion of metal surfaces present in or associated with oil and gas wells for only a short period of time, if at all. It is too expensive and inconvenient to reapply a corrosion-inhibiting agent on a frequent basis, particularly if the well is not easily accessible and/or if, as in the case of offshore wells, the well is difficult to treat. Due to their high molecular weight and low solubility, many conventional corrosion-inhibiting agents tend to gunk up in oil and gas wells which results in other problems. Some conventional corrosion-inhibiting agents are not compatible with other well treating agents and cause more corrosion than they reduce.

By the present invention, an improved corrosion-inhibiting composition and method of treating a metal surface with the same are provided. The corrosion-inhibiting composition and method very effectively prevent or at least inhibit corrosion of metal surfaces present in or associated with highly corrosive environments such as environments typically encountered in oil and gas wells.

SUMMARY OF THE INVENTION

In one aspect, the present invention provides a composition which forms a corrosion-inhibiting film when applied to a metal surface. The composition comprises a polymer formed by polymerizing a vinyl monomer in the presence of a mercaptan chain transfer agent.

In a preferred embodiment, the vinyl monomer is selected from the group consisting of alkenoic acids, esters of alkenoic acids, acrylonitriles, esters of vinyl alcohols, acrylamides, N-vinyl-2-pyrrolidone and mixtures thereof. In a preferred embodiment, the mercaptan chain transfer agent is selected from the group consisting of n-alkyl mercaptans, primary mercapto carboxylic acids, esters of primary mercapto carboxylic acids, primary mercapto alcohols, esters derived from primary mercapto alcohols, ethers derived from primary mercapto alcohols and mixtures thereof. The molar ratio of the vinyl monomer to the mercaptan is preferably in the range of from about 2 to about 40 moles of the vinyl monomer to about 1 mole of the mercaptan.

Preferred embodiments of the composition comprise a low molecular weight polymer represented by the general formula:

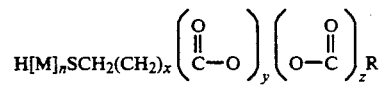

wherein M is a repeating vinyl monomer unit, n is from about 2 to about 40, x is from 0 to about 10, y is from 0 to 1, z is from 0 to 1 if y is 0 and 0 if y is 1 and R is hydrogen, an alkyl group, a hydroxy alkyl group or an alkoxy group.

In another aspect, the present invention provides a method of treating a metal surface comprising contacting the metal surface with a composition that forms a corrosion-inhibiting film thereon. The composition used in the method is the composition forming the first aspect of the present invention.

It is, therefore, a principal object of the present invention to provide a composition which effectively inhibits corrosion and pitting of a metal surface when applied thereto.

It is also an object of the present invention to provide an effective method of treating a metal surface to inhibit corrosion thereof.

Another object of the present invention is to provide a composition which effectively inhibits corrosion and pitting of metal surfaces that are present in or associated with highly corrosive environments such as environments typically encountered in oil and gas wells.

A further object of the present invention is to provide compositions and methods for inhibiting corrosion of metal surfaces present in or associated with oil and gas wells that result in improved corrosion inhibition for a relatively long period of time thereby reducing the frequency of treatments required.

Other objects, features, uses and advantages of the present invention will be readily apparent to those skilled in the art upon a reading of the following description of the preferred embodiments of the present invention.

DESCRIPTION OF THE PREFERRED EMBODIMENTS

In a first aspect, the present invention provides a composition which forms a corrosion-inhibiting film when applied to a metal surface. In a second aspect, the present invention provides a method of treating a metal surface which comprises the step of contacting the metal surface with the composition forming the first aspect of the invention.

The composition comprises a low molecular weight polyfunctional polymer that is formed in a free-radical polymerization process in which a vinyl monomer is polymerized in the presence of a mercaptan chain transfer agent or molecular weight modifier. The mercaptan acts both to terminate the growing polymer chain and to reinitiate polymerization resulting in polymers having a low molecular weight.

The low molecular weight polyfunctional polymer of the composition comprises both a repeating monomer unit and a sulfur containing group. The polymer is a polyfunctional polymer in that both the repeating monomer unit and the sulfur group act to inhibit corrosion of metal surfaces when the polymer is applied thereto. When applied to a metal surface, the polymer is very durable thereby extending the time that inhibition is achieved.

The vinyl monomer used to form the low molecular weight polymer of the composition can be any vinyl monomer that undergoes free-radical polymerization. The vinyl monomer is preferably soluble or dispersible in water, alcohols and ketones. Preferably, the vinyl monomer is selected from the group consisting of alkenoic acids, esters of alkenoic acids, acrylonitriles, esters of vinyl alcohols, acrylamides, N-vinyl-2-pyrrolidone and mixtures thereof. Examples of suitable alkenoic acids include acrylic acid, methacrylic acid and ethacrylic acid. The alkenoic acids are preferably alpha, beta-alkenoic acids. Examples of suitable esters of alkenoic acids include methyl acrylate, 2-hydroxyethyl methacrylate, 2-methoxyethyl acrylate, 2-hydroxypropyl acrylate, methyl methacrylate and 2-hydroxyethyl acrylate. Examples of suitable acrylonitriles include methacrylonitrile and ethacrylonitrile. Examples of suitable esters of vinyl alcohols include vinyl acetate, vinyl propionate and vinyl butyrate. Examples of suitable acrylamides include methacrylamide and ethacrylamide.

More preferably, the vinyl monomer used to form the low molecular weight polymer of the composition is selected from the group consisting of acrylic acid, methacrylic acid and 2-hydroxyethyl methacrylate. Most preferably, the vinyl monomer used to form the low molecular weight polymer of the composition is acrylic acid.

The mercaptan chain transfer agent preferably comprises a primary mercaptan selected from the group consisting of n-alkyl mercaptans, primary mercapto carboxylic acids, esters of primary mercapto carboxylic acids, primary mercapto alcohols, esters derived from primary mercapto alcohols, ethers derived from primary mercapto alcohols and mixtures thereof. Primary mercaptans are more reactive with the growing polymer chain than secondary and other mercaptans are. The n-alkyl mercaptans preferably have in the range of from 6 to 18 carbon atoms. Examples of suitable n-alkyl mercaptans include n-hexyl mercaptan, n-octyl mercaptan and n-dodecyl mercaptan. Examples of suitable primary mercapto carboxylic acids include 2-mercapto acetic acid (thioglycolic acid), 3-mercapto propionic acid and 2-methyl-3-mercapto propionic acid. Examples of suitable esters of primary mercapto carboxylic acids include methyl-3-mercaptopropionate, butyl-3-mercaptopropionate and alkyl thioglycolates. Examples of suitable primary mercapto alcohols include 2-mercaptoethanol, 1-mercapto-2-propanol and 3-mercaptopropanol. Examples of suitable esters derived from primary mercapto alcohols include 2-mercaptoethyl acetate, 1-methyl-2-mercaptoethyl acetate and 2-mercaptoethyl propionate. Examples of suitable ethers derived from primary mercapto alcohols include 2-mercaptoethyl ethyl ether, 2-mercaptoethyl propyl ether and 3-mercaptopropyl hexyl ether. Preferably, the primary mercapto carboxylic acids, esters derived from primary mercapto carboxylic acids, primary mercapto alcohols, esters derived from primary mercapto alcohols and ethers derived from primary mercapto alcohols have in the range of from 2 to 30 carbon atoms.

Preferably, the mercaptan chain transfer agent is a n-alkyl mercaptan having in the range of from 6 to 18 carbon atoms. Most preferably, the mercaptan chain transfer agent is n-dodecyl mercaptan.

The relative amounts of the vinyl monomer and mercaptan used to form the low molecular weight polyfunctional polymer are very important. Generally, the amount of mercaptan employed is inversely proportional to the molecular weight of the polymer product obtained. Superior results are achieved by polymers having very low molecular weights. Preferably, the molar ratio of the vinyl monomer to the mercaptan is in the range of from about 2 to about 40 moles of the vinyl monomer to about 1 mole of the mercaptan. More preferably, the molar ratio of the vinyl monomer to the mercaptan is in the range of from about 2 to about 20 moles of the vinyl monomer to about 1 mole of the mercaptan. Most preferably, the molar ratio of the vinyl monomer to the mercaptan is in the range of from about 2 to about 5 moles of the vinyl monomer to about 1 mole of the mercaptan.

The free-radical polymerization process used to form the low molecular weight polymer of the composition of the present invention can be illustrated by the following general mechanism:

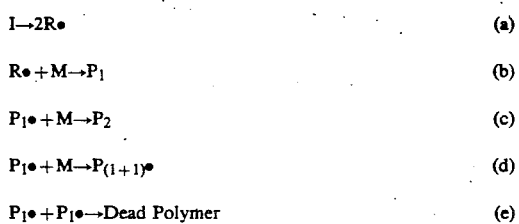

First, as shown by step (a), a molecule of free-radical initiator, (I), decomposes to from a free-radical (R•). Next, as shown by step (b), the free-radical (R•) reacts with monomer (M) to give an initiated polymer chain ($P_1$). The initiated polymer chain ($P_1$) reacts with monomer (M) (step (c)) to yield a polymer chain ($P_2$) with a chain length of 2. The polymer continues to grow by the addition of monomer units thereto (step (d)).

Normally, the polymerization is terminated when two growing polymer chains react, either by radical recombination or disproportionation, to give dead polymer (step (e)). This generally leads to a polymer having a relatively high molecular weight. The relative rates of steps (d) and (e) determine the molecular weight of the polymer.

As shown by the general mechanism illustrated below, the mercaptan chain transfer agent is used to donate a hydrogen atom to the growing polymer chain and thereby terminate it (step (1)). The resulting mercaptide radical (RS•) can react with free monomer to initiate a new polymer chain (steps (2) and (3)), resulting in a lower molecular weight for the product polymer than would otherwise be expected.

  (1)

  (2)

  (3)

Any known free-radical initiator can be employed. Suitable free-radical initiators include hydrogen peroxide, organic peroxides such as hydroperoxides and lauroyl peroxide, diazo compounds such as diazobisisobutyronitrile, azo compounds such as azobisisobutyronitrile and water soluble persulfates such as ammonium persulfate. Preferably, the free-radical initiator used to initiate the polymerization is selected from the group consisting of peroxides, persulfates and azobisisobutyronitrile. The amount of free-radical initiator employed depends on the initiator, the monomer, the reaction medium, the polymer molecular weight desired and other factors known to those skilled in the art. The free-radical initiator is preferably used in an amount in the range of from about 0.1 g to about 8.0 g of initiator per mole of vinyl monomer employed. Activators such as N-N-dimethylaniline can be employed if desired.

The free-radical polymerization can be conducted in any solvent or solvent system which will dissolve the reactants without significantly reacting therewith. It is not necessary for the polymer product to be soluble in the solvent or solvents employed.

Preferably, the solvent or solvents comprise a solvent that can be conveniently used in carrying out the method of the present invention. For example, in some treatment methods, it is advantageous to employ a carrier liquid or drive fluid to force a slug of the corrosion-inhibiting composition down into the well being treated. The solvent or solvents used in the polymerization can be the same as the carrier liquid or drive fluid used in the method. This eliminates the step of recovering the product polymer from the solvent or solvents after the polymerization is complete. Examples of suitable solvents include methanol, ethanol, isopropanol, acetone, methyl ethyl ketone and water.

The free-radical polymerization is preferably conducted at a temperature in the range of from about 30° C. to about 170° C. More preferably, the polymerization is conducted at a temperature in the range of from about 40° C. to about 120° C. If desired, an oxygen-free reaction environment can be achieved by passing an inert gas such as nitrogen through the reaction system.

The free-radical polymerization can be carried out by a variety of methods. A convenient method of carrying out the polymerization is to initially dissolve the mercaptan and the vinyl monomer in a solvent. The free-radical initiator and activator, if used, can be charged initially or added during the reaction. Upon completion of the reaction, the solvent can be separated from the polymer product by vacuum stripping.

As stated above, the composition of the present invention comprises a low molecular weight polyfunctional polymer formed by polymerizing a vinyl monomer in the presence of a mercaptan chain transfer agent. A general formula representing all low molecular weight polyfunctional polymers formed by polymerizing a vinyl monomer in the presence of a chain transfer agent is difficult to provide. A preferred embodiment of the composition of the present invention comprises a low molecular weight polyfunctional polymer represented by the general formula (I) below:

  (I)

wherein the monomer is a vinyl monomer, n is from about 2 to about 40 and R is any carbon containing group that is capable of bonding with a sulfur atom to form a mercaptan. Preferably, n is from about 2 to about 20, more preferably from about 2 to about 5.

A more preferred embodiment of the composition of the present invention comprises a low molecular weight polymer represented by the general formula (II) below:

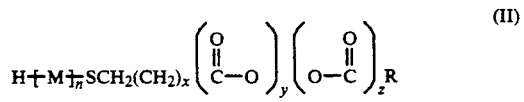  (II)

wherein M is a repeating vinyl monomer unit, n is from about 2 to about 40, x is from 0 to about 10, y is from 0 to 1, z is from 0 to 1 if y is 0 and 0 if y is 1 and R is hydrogen, an alkyl group, a hydroxy alkyl group or an alkoxy group.

The repeating vinyl monomer unit can be any vinyl monomer that undergoes free-radical polymerization. Preferably, the repeating vinyl monomer unit is selected from the group consisting of alkenoic acids, esters of alkenoic acids, acrylonitriles, esters of vinyl alcohols, acrylamides and N-vinyl-2-pyrrolidone. Examples of suitable alkenoic acids include acrylic acid, methacrylic acid, and ethacrylic acid. The alkenoic acids are preferably alpha, beta-alkenoic acids. Examples of suitable esters of alkenoic acids include methyl acrylate, 2-hydroxyethyl methacrylate, 2-methoxyethyl acrylate, 2-hydroxypropyl acrylate, methyl methacrylate and 2-hydroxyethyl acrylate. Examples of suitable acrylonitriles include methacrylonitrile and ethacrylonitrile. Examples of suitable esters of vinyl alcohols include vinyl acetate, vinyl propionate and vinyl butyrate. Examples of suitable acrylamides include methacrylamide and ethacrylamide.

More preferably, the repeating vinyl monomer unit is selected from the group consisting of acrylic acid, methacrylic acid and 2-hydroxyethyl methacrylate. Most preferably, the repeating vinyl monomer unit is acrylic acid.

Preferably, n is in the range of from about 2 to about 20. More preferably, n is in the range of from about 2 to about 5.

The remaining variables of the general formula (II) above vary depending upon the particular mercaptan used to form the polymer. For example, if a primary mercaptan having from 6 to 18 carbon atoms is used to form the polymer, x, y and z will be 0, and R will be an alkyl group having in the range of from 5 to 17 carbon atoms. If n-dodecyl mercaptan is used to form the polymer, x, y and z will be 0, and R will be an alkyl group having 11 carbon atoms. If the mercaptan used to form the polymer is mercaptoacetic acid, x will be 0, y will be 1 and z will be 0, and R will be a hydrogen atom. If the mercaptan used to form the polymer is an alkyl thioglycolate, x will be 0, y will be 1 and z will be 0, and R will be an alkyl group. If a primary mercapto alcohol is used to form the polymer, x, y and z will be 0, and R will be a hydroxy alkyl group.

Examples of specific low molecular weight polyfunctional polymers within the scope of the present invention and represented by the general formulas I and II above include:

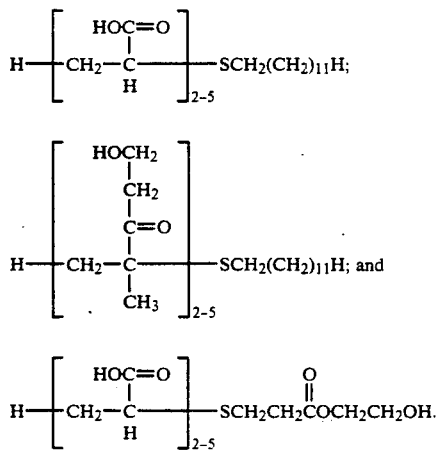

The method of the present invention, a method of treating a metal surface, comprises contacting the metal surface with a composition that forms a corrosion-inhibiting film thereon, the composition being the composition of the present invention described above. The method can be effectively used to protect any metal surface, particularly metal surfaces containing iron and steel.

The method of the present invention is particularly useful for treating metal surfaces such as metal pipes and casings in oil, gas and geothermal wells which are subjected to high temperatures and pressures and corrosive chemicals. Down-well treatments in accordance with the method of the present invention can be effected by a variety of techniques. The particular treatment technique employed will vary depending upon various factors including the particular chemical and physical characteristics of the well being treated. Examples of treatment techniques which can be employed to carry out the method of the present invention are described in U.S. Pat. Nos. 4,526,813, 4,608,191 and 4,650,594, all assigned to the assignee of the present application and incorporated by reference herein. These examples include the following:

Batch Treatment. This technique can be carried out by introducing the composition of the present invention into the annulus of a cased wellbore between the casing and the tubing. Preferably, the composition is admixed with an oil carrier and introduced into the annulus therewith. The well is then returned to production and the composition is gradually returned with the produced fluids, coating the metal surfaces that it contacts along the way with a corrosion-inhibiting film. Alternatively, this technique can be carried out by placing a liquid column of the composition in the tubing or the annular space and allowing the column to stand for a time period ranging from 10 minutes to 24 hours before resuming production. In most applications, it will be necessary to allow the column to stand for at least 2 hours.

Extended Batch Treatment. In carrying out this technique, the composition of the present invention is injected into the annulus of a cased wellbore between the casing and the tubing, the well is closed off and the composition is continuously circulated with well fluids down the annulus and up the tubing. The composition is circulated for an extended period of time, usually between 2 and 48 hours, depending upon the depth of the well. After the composition has been circulated for a sufficient amount of time, the well is returned to production.

Squeeze Treatment. This technique is carried out by injecting the composition of the present invention down a cased wellbore and forcing the composition into the formation against formation pressure by using high-pressure pumps. The composition can be admixed with a gelled or dispersed polymer matrix base and injected down the wellbore therewith. After the pressure is released, the composition is slowly produced with the recovered fluids, coating the metal surfaces it contacts along the way with a corrosion-inhibiting film. This technique is particularly suitable in high-pressure oil and/or gas wells.

Spearhead Treatment. This technique is carried out by injecting a highly concentrated slug of the composition of the present invention into the tubing of a cased wellbore and pressuring the slug down the tubing with a fluid column of diesel, produced gas, nitrogen or a brine solution such as a solution containing 2% by weight potassium chloride. When the pressure is released, the fluid column and the excess composition are produced back to the tubing. The composition contacts the metal walls of the tubing and applies a corrosion-inhibiting film thereon as it flows in a downward and upward circuit.

Continuous Treatment. This method is carried out by injecting a solution of the composition of the present invention into the annulus of a cased wellbore and producing the solution by the tubing. The volume of injected fluid is regulated to any desired volume per unit time by the use of conventional pumping procedures.

Metal surfaces can also be protected in accordance with the method of the present invention by dipping or spraying the surfaces with the composition of the present invention and allowing excess fluid to drain from the surfaces at ambient conditions. Although the composition of the present invention can be applied to metal surfaces that have an oil coating thereon, it is not necessary to pre-treat the metal surfaces with oil or other substances prior to applying the composition thereto.

In all treatment methods, the composition of the present invention is preferably diluted with a solvent or carrier and applied to the metal surface or surfaces therewith. The concentration of the composition in the resulting solution varies depending upon many factors including the environment surrounding the metal surfaces and the particular treatment technique employed. Generally, the composition of the present invention will be employed in a solvent or carrier in an amount in the range of from about 0.0001 to about 80 percent by weight of the solvent or carrier. In most applications, the composition will be employed in a solvent or carrier in an amount in the range of from about 0.0005 to about 50 percent by weight of the solvent or carrier.

The composition and method of the present invention achieve many advantages not achieved by other corrosion-inhibiting agents developed heretofore. As shown by the examples below, the composition of the present invention will decrease the corrosion rate of metal surfaces present in oil and gas wells from 100 mils/yr. and above to around 0.01 mils/yr., essentially zero. The repeating monomer unit and the sulfur containing group of the polymer of the composition both act to inhibit corrosion. This combined with the low molecular weight of the polymer makes the composition of the present invention superior to high molecular weight polymeric products and other corrosion-inhibiting agents developed heretofore. The corrosion-inhibiting film adheres to the metal surfaces and lasts for a very long time. The composition is easy to transport and can be premixed on site.

The composition of the present invention is very stable, even under the extreme conditions that can be encountered in highly corrosive environments such as environments encountered in oil and gas wells. It does not significantly react with acids and other treating agents in the well. Due to its low molecular weight, the composition does not gunk up in the well. The amount of the composition that must be used is much less than the amount of other corrosion-inhibiting agents developed heretofore that must be used to significantly inhibit corrosion. The composition does not emit offensive mercaptan or sulfur odors.

The following examples are provided to further illustrate the present invention.

EXAMPLE I

Various low molecular weight polyfunctional polymers were prepared by polymerizing vinyl monomers in the presence of mercaptan chain transfer agents. Three polymerization procedures were employed.

Procedure A

In accordance with Procedure A, various polymers were prepared by adding a mixture of the monomer, the chain transfer agent, a free-radical initiator and a first solvent to a refluxing solvent. The free-radical initiator was 2,2'-azobisisobutyronitrile (AIBN). The first solvent was methyl ethyl ketone while the refluxing solvent was isopropyl alcohol.

First, a polymer was formed by polymerizing acrylic acid in the presence of n-dodecyl mercaptan with a molar ratio of acrylic acid to n-dodecyl mercaptan of about 2.5 to 1. The polymerization was conducted in a 500 milliliter triple-necked flask equipped with an addition funnel, a condenser, a thermometer and a magnetic stirring bar. The flask was submerged in a hot oil bath. Approximately 40 grams of the refluxing solvent was placed in the flask. Thereafter, 36 grams of acrylic acid, 0.54 grams of the free-radical initiator, 40 grams of n-dodecyl mercaptan and 40 grams of the first solvent were placed in the addition funnel, maintained therein at a temperature below 20° C. and added drop by drop as fast as possible to the refluxing solvent in the flask. As the admixture of acrylic acid, free-radical initiator, mercaptan and first solvent was added to the flask, the final temperature of the components in the flask was maintained so that reflux of the refluxing solvent was continuous. The final temperature of the components in the flask was maintained for approximately two hours. The resulting low molecular weight polyfunctional polymer was recovered by vacuum stripping the solvents at approximately 100° C.

Other polymers were then prepared by using the same procedure. Only the molar ratio of the vinyl monomer to the mercaptan and the particular monomers and mercaptans used were varied.

A summary of the polymers prepared in accordance with Procedure A is provided by Table I below.

TABLE I

Low Molecular Weight Polyfunctional Polymers Formed by Procedure A

| Polymer | Monomer | Mercaptan | Molar Ratio of Monomer to Mercaptan |
|---|---|---|---|
| 1 | acrylic acid | n-dodecyl mercaptan | 2.5:1 |
| 2 | acrylic acid | n-dodecyl mercaptan | 3.3:1 |
| 3 | acrylic acid | methyl-3-mercapto-propionate | 2.5:1 |
| 4 | acrylic acid | 2-hydroxy-ethyl-3-mercaptopropionate | 2.5:1 |
| 5 | 2-hydroxy-ethyl methacrylate | n-dodecyl mercaptan | 2.5:1 |
| 6 | acrylic acid | n-hexyl mercaptan | 2.5:1 |
| 7 | acrylic acid | octadecyl thioglycolate | 2.5:1 |
| 8 | acrylic acid | n-octadecyl mercaptan | 2.5:1 |
| 9 | acrylic acid | isooctyl thioglycolate | 2.5:1 |
| 10 | acrylonitrile | n-dodecyl mercaptan | 2.5:1 |
| 11 | 50% acrylic acid and 50% acrylonitrile | n-dodecyl mercaptan | 2.5:1 |
| 12 | N-vinyl-2-pyrrolidone | n-dodecyl mercaptan | 2.5:1 |
| 13 | 50% acetic acid and 50% N-vinyl-2-pyrrolidone | n-dodecyl mercaptan | 2.5:1 |

Procedure B

In accordance with Procedure B, two polymers were prepared by adding a free-radical initiator solution, at a controlled rate, to a mixture of the monomer, the mercaptan chain transfer agent and a first solvent. The free-radical initiator solution consisted of ammonium persulfate in methanol. The first solvent was methanol.

First, a polymer was formed by polymerizing acrylic acid in the presence of n-dodecyl mercaptan with a molar ratio of acrylic acid to n-dodecyl mercaptan of about 10:1. The polymerization was conducted in a flask equipped the same as the flask employed in Procedure A. The flask was submerged in a hot oil bath. Approximately 72 grams of acrylic acid, 80.8 grams of n-dodecyl mercaptan and 100 grams of methanol were placed in the flask. Thereafter, the mixture in the flask was heated to 35° C. and, while stirring, approximately 74 milliliters of the free-radical initiator solution (0.66 grams ammonium persulfate per 100 milliliters of methanol) were added to the mixture drop by drop over a period of three hours. After the free-radical initiator solution was added, the temperature of the mixture was maintained at a value above 35° C. for an additional two hours. The resulting low molecular weight polyfunctional polymer was recovered by vacuum stripping the solvents at approximately 100° C.

The second polymer was then prepared by the same procedure. Only the molar ratio of the monomer to the mercaptan was varied.

A summary of the two polymers prepared in accordance with Procedure B is provided by Table II below.

TABLE II

Low Molecular Weight Polyfunctional Polymers Formed by Procedure A

| Polymer | Monomer | Mercaptan | Molar Ratio of Monomer to Mercaptan |
|---|---|---|---|
| 14 | acrylic acid | n-dodecyl mercaptan | 10:1 |

TABLE II-continued

Low Molecular Weight Polyfunctional
Polymers Formed by Procedure A

| Polymer | Monomer | Mercaptan | Molar Ratio of Monomer to Mercaptan |
|---|---|---|---|
| 15 | acrylic acid | n-dodecyl mercaptan | 2.5:1 |

Procedure C

In accordance with Procedure C, two polymers were prepared by adding an activator to a mixture of the monomer, the chain transfer agent, a free-radical initiator and a first solvent. The activator was N,N-dimethylaniline. The free-radical initiator was tert-butyl peroxide. The first solvent was isopropanol.

The first polymer was formed by polymerizing acrylic acid in the presence of n-dodecyl mercaptan with a molar ratio of acrylic acid to n-dodecyl mercaptan of about 10 to 1. The polymerization was conducted in a flask equipped the same as the flask employed in Procedures A and B. The flask was submerged in a hot oil bath. Approximately 72 grams of acrylic acid, 80.8 grams of n-dodecyl mercaptan, 1.10 grams of the free-radical initiator and 275 grams of the first solvent were placed in the flask. The mixture in the flask was heated to approximately 45° C. and, while stirring, approximately 7 drops of the activator were added thereto. Upon addition of the activator, the temperature increased to approximately 55° C. When the temperature decreased to approximately 45° C., an additional 8 drops of the activator were added. The second addition of the activator also caused an increase in the temperature of the components in the flask. The temperature of the mixture was maintained at a value above 45° C. for an additional two hours. The resulting low molecular weight polyfunctional polymer was recovered by vacuum stripping the solvent at approximately 100° C.

The second polymer was then prepared using the same procedure. Only the molar ratio of the vinyl monomer to the mercaptan was varied.

A summary of the two polymers prepared in accordance with Procedure C is provided by Table III below.

TABLE III

Low Molecular Weight Polyfunctional
Polymers Formed by Procedure C

| Polymer | Monomer | Mercaptan | Molar Ratio of Monomer to Mercaptan |
|---|---|---|---|
| 16 | acrylic acid | n-dodecyl mercaptan | 10:1 |
| 17 | acrylic acid | n-dodecyl mercaptan | 2.5:1 |

EXAMPLE II

The polymers prepared in accordance with Procedure A of Example I (polymers 1-5) were tested for performance as corrosion inhibitors. The tests were carried out under laboratory conditions designed to simulate the corrosive oil-water environments encountered in oil and gas wells.

Each test was carried out in a one-liter Erlenmeyer flask equipped with a magnetic stirring bar. Approximately 100 milliliters of kerosene, 900 milliliters of a synthetic brine solution (17 g $CaCl_2.2H_2O$, 7.8 g $MgCl_2.6H_2O$, and 405 g NaCl in one gal. of distilled water) and the polymer being tested were placed in the flask. A slow stream of carbon dioxide ($CO_2$) was bubbled through the solution to maintain the mixture near saturation with $CO_2$ at ambient conditions. The rate of corrosion was determined using a CORRATOR® monitoring system available from Rohrback Instruments. A carbon steel probe was suspended in the stirred oil-water mixture which was maintained at approximately 120° F. under atmospheric pressure. The rate of corrosion was measured for approximately 24 hours.

The results of the test are summarized in Table IV below.

TABLE IV

Effectiveness of Low Molecular Weight Polyfunctional Polymers As Corrosion Inhibitors

| Elapsed Time (Hours) | Corrosion Rate Blank[1] (mpy)[2] | Corrosion Rate Polymer 1[3] (mpy)[2] | Corrosion Rate Polymer 2[3] (mpy)[2] | Corrosion Rate Polymer 3[3] (mpy)[2] | Corrosion Rate Polymer 4[3] (mpy)[2] | Corrosion Rate Polymer 5[3] (mpy)[2] |
|---|---|---|---|---|---|---|
| 0.00 | 134.54 | 131.93 | 103.34 | 104.21 | 128.22 | 142.93 |
| 1.01 | 139.81 | 151.88 | 133.12 | 151.65 | 141.86 | 143.61 |
| 2.02 | 137.79 | 6.67 | 7.30 | 17.65 | 6.04 | 9.61 |
| 3.02 | 136.36 | 2.21 | 5.42 | 12.15 | 4.00 | 3.86 |
| 4.02 | 135.29 | 0.63 | 4.58 | 10.16 | 2.72 | 2.21 |
| 5.03 | 134.51 | 0.25 | 3.94 | 8.96 | 2.25 | 1.55 |
| 6.03 | 134.36 | 0.18 | 3.43 | 7.95 | 2.00 | 1.15 |
| 7.03 | 134.08 | 0.08 | 3.03 | 7.53 | 1.84 | 0.81 |
| 8.04 | 134.49 | 0.02 | 2.66 | 7.24 | 1.74 | 0.71 |
| 9.04 | 133.74 | 0.01 | 2.39 | 6.95 | 1.64 | 0.59 |
| 10.04 | 133.86 | 0.01 | 2.20 | 6.78 | 1.59 | 0.53 |
| 11.04 | 132.86 | 0.01 | 2.05 | 6.64 | 1.55 | 0.45 |
| 12.05 | 133.08 | 0.01 | 1.93 | 6.46 | 1.54 | 0.42 |
| 13.05 | 133.30 | 0.01 | 1.83 | 6.30 | 1.50 | 0.37 |
| 14.05 | 133.20 | 0.01 | 1.76 | 6.19 | 1.48 | 0.36 |
| 15.06 | 132.70 | 0.01 | 1.71 | 6.03 | 1.46 | 0.34 |
| 16.06 | 132.97 | 0.01 | 1.68 | 5.91 | 1.43 | 0.33 |
| 17.06 | 133.54 | 0.01 | 1.65 | 5.81 | 1.41 | 0.30 |
| 18.07 | 134.30 | 0.01 | 1.62 | 5.66 | 1.36 | 0.31 |
| 19.07 | 134.00 | 0.01 | 1.58 | 5.54 | 1.33 | 0.30 |
| 20.07 | 134.65 | 0.01 | 1.55 | 5.48 | 1.30 | 0.29 |
| 21.07 | 135.27 | 0.01 | 1.52 | 5.43 | 1.27 | 0.26 |
| 22.07 | 136.07 | 0.01 | 1.50 | 5.36 | 1.24 | 0.29 |

TABLE IV-continued

Effectiveness of Low Molecular Weight Polyfunctional Polymers As Corrosion Inhibitors

| Elapsed Time (Hours) | Corrosion Rate Blank[1] (mpy)[2] | Corrosion Rate Polymer 1[3] (mpy)[2] | Corrosion Rate Polymer 2[3] (mpy)[2] | Corrosion Rate Polymer 3[3] (mpy)[2] | Corrosion Rate Polymer 4[3] (mpy)[2] | Corrosion Rate Polymer 5[3] (mpy)[2] |
|---|---|---|---|---|---|---|
| 23.07 | 136.08 | 0.01 | 1.47 | 5.32 | 1.21 | 0.28 |
| 24.07 | 136.31 | 0.01 | 1.45 | 5.27 | 1.20 | 0.28 |
| 25.07 | 136.65 | 0.01 | 1.44 | 5.18 | 1.18 | 0.28 |

[1]A corrosion inhibitor was not employed.
[2]Mils per year (one thousandth of an inch per year).
[3]See Table I above.

The results of the tests show that the low molecular weight polyfunctional polymers of the present invention will effectively decrease the corrosion rate of metal surfaces present in oil and gas wells. Polymers 1 and 5 decreased the corrosion rate determined in the tests from over 130 mpy to 0.01 mpy and 0.28 mpy, respectively. The other polymers tested were also extremely effective.

The preceding Examples can be repeated with similar success by substituting the generically or specifically described reactants and/or operating conditions of the invention for those used in the examples. Other low molecular weight polyfunctional polymers within the scope of this invention can be prepared and tested by the same procedure described in the Examples.

From the foregoing description, one skilled in the art can easily ascertain the essential characteristics of the invention and, without departing from the scope and spirit thereof, can make various changes and modifications to the invention to adapt it to various usages and conditions.

We claim:

1. A composition which forms a corrosion-inhibiting film when applied to a metal surface, the composition comprising a polymer represented by the general formula:

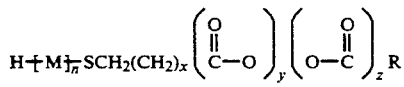

wherein:
M, a repeating monomer unit, is an alkenoic acid;
n is from about 2 to about 5;
x is from 0 to about 10;
y is from 0 to 1;
z is from 0 to 1 if y is 0 and 0 if y is 1; and
R is hydrogen, an alkyl group, a hydroxy alkyl group or an alkoxy group.

2. The composition of claim 1 wherein said alkenoic acid represented by M is selected from the group consisting of acrylic acid and methacrylic acid.

3. The composition of claim 2 wherein said alkenoic acid represented by M is acrylic acid.

4. The composition of claim 1 wherein x, y and z are 0, and R is an alkyl group having in the range of from 5 to 17 carbon atoms.

5. The composition of claim 1 wherein x, y and z are 0, and R is a n-undecyl group.

6. The composition of claim 1 wherein x is 0 to 10, y is 1 and z is 0, and R is an alkyl group.

7. The composition of claim 1 wherein x, y and z are 0, and R is a hydroxy alkyl group.

8. The composition of claim 1 wherein said polymer is formed by polymerizing a vinyl monomer in the presence of a mercaptan chain transfer agent.

9. The composition of claim 8 wherein said polymer is formed by polymerizing a vinyl monomer in the presence of a mercaptan chain transfer agent and in the presence of a free-radical initiator.

10. The composition of claim 9 wherein said free-radical initiator is selected from the group consisting of peroxides, persulfates and azobisisobutyronitrile.

11. The composition of claim 9 wherein said polymerization is carried out in a reaction medium comprising a solvent selected from the group consisting of methanol, ethanol, isopropanol, acetone, methyl ethyl ketone and water.

12. The composition of claim 1 wherein n is an average of 2.5.

13. The composition of claim 1 wherein n is an average of 3.3.

* * * * *